(12) United States Patent
Avrahami et al.

(10) Patent No.: US 10,867,448 B2
(45) Date of Patent: Dec. 15, 2020

(54) LOW-POWER, PERSONALIZED SMART GRIPS FOR VR/AR INTERACTION

(71) Applicant: FUJI XEROX CO., LTD., Tokyo (JP)

(72) Inventors: Daniel Avrahami, Mountain View, CA (US); Christine Marie Dierk, Berkeley, CA (US); Scott Carter, Menlo Park, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/274,181

(22) Filed: Feb. 12, 2019

(65) Prior Publication Data
US 2020/0258303 A1  Aug. 13, 2020

(51) Int. Cl.
| | |
|---|---|
| *G06F 3/01* | (2006.01) |
| *G06K 9/00* | (2006.01) |
| *G06F 1/16* | (2006.01) |
| *G06T 19/00* | (2011.01) |

(Continued)

(52) U.S. Cl.
CPC ............ *G06T 19/006* (2013.01); *G02B 27/01* (2013.01); *G02B 27/017* (2013.01); *G06F 1/163* (2013.01); *G06F 3/011* (2013.01); *G06F 3/014* (2013.01); *G06F 3/017* (2013.01);
(Continued)

(58) Field of Classification Search
CPC ........ G06F 1/163; G06F 3/017; G06F 3/0487; G06F 3/04883; G06F 3/0482; G06F 3/0485; G06F 3/011; G06K 9/00335; G06K 9/00389; G06K 9/00355; G09G 2370/16;
(Continued)

(56) References Cited

U.S. PATENT DOCUMENTS

| | | |
|---|---|---|
| 3,228,391 A | 1/1966 | Fitter et al. |
| 3,608,545 A | 9/1971 | Acker et al. |
| 8,948,832 B2 | 2/2015 | Hong et al. |

(Continued)

FOREIGN PATENT DOCUMENTS

| | | |
|---|---|---|
| EP | 3299930 A1 | 3/2018 |
| WO | 2016189372 A3 | 12/2016 |

OTHER PUBLICATIONS

Google.com, Use the Daydream View Controller and Headset, [online], [retrieved Dec. 10, 2019], 1 pg., URL: https://support.google.com/daydream/answer/7184597?hl=en.
(Continued)

*Primary Examiner* — Jin Cheng Wang
(74) *Attorney, Agent, or Firm* — Procopio, Cory, Hargreaves & Savitch LLP

(57) ABSTRACT

Recent technical advances have expanded the breadth, scope, and affordability of virtual reality (VR) and augmented reality (AR) systems. More people can use VR and AR systems than ever before. However, hand-held physical controls for these systems have not made similar advances yet. For this reason, it remains difficult for developers to create applications that take advantage of the full range of human abilities. In this proposal, we describe a system and method for combining off-the-shelf smartwatches with a set of inexpensive grips or sheaths to control VR/AR systems. With our approach, all of the computation and power for the controller derive from the smartwatch unit, allowing the grips to take almost any form, and allowing developers and designers to integrate a much wider array of interaction styles into their applications.

21 Claims, 11 Drawing Sheets

(51) Int. Cl.
*G02B 27/01* (2006.01)
*H04N 5/232* (2006.01)

(52) U.S. Cl.
CPC ... *H04N 5/23219* (2013.01); *G02B 2027/014* (2013.01); *G02B 2027/0178* (2013.01)

(58) Field of Classification Search
CPC .............. G09G 5/003; G02B 2027/014; G02B 2027/0178; G02B 27/017
USPC ......................................................... 345/520
See application file for complete search history.

(56) References Cited

U.S. PATENT DOCUMENTS

| | | | |
|---|---|---|---|
| D750,074 S | 2/2016 | Coz et al. | |
| 2015/0325202 A1* | 11/2015 | Lake | G09G 5/003 345/520 |
| 2015/0346834 A1* | 12/2015 | Martinez Fernandez | G06F 3/017 340/12.5 |
| 2016/0127900 A1* | 5/2016 | John Archibald | H04W 12/06 726/7 |
| 2016/0232715 A1 | 8/2016 | Lee | |
| 2016/0299570 A1* | 10/2016 | Davydov | G06F 3/014 |
| 2016/0335876 A1* | 11/2016 | Verma | G01S 11/06 |
| 2017/0024612 A1* | 1/2017 | Wexler | G06K 9/00389 |
| 2017/0064363 A1* | 3/2017 | Wexler | G06K 9/00677 |
| 2017/0177833 A1* | 6/2017 | Lewallen | G06F 19/3481 |
| 2018/0059714 A1 | 3/2018 | Martin et al. | |
| 2019/0295429 A1* | 9/2019 | McHugh | G09B 19/0038 |

OTHER PUBLICATIONS

Alivecor.com, KardiaMobile, [online] [retrieved Dec. 10, 2019], 1 pg., URL: https://store.alivecor.com/.

Kickstarter.com, Smart Buckle: Convert Any Watch into a Fitness Tracker, [online] [retrieved Dec. 23, 2019], 38 pgs., URL: https://www.kickstarter.com/projects/20345353/smart-buckle-convert-any-watch-into-a-smartwatch-i/.

Ahn, Y., et al. BandSense: Pressure-Sensitive Multi-Touch Interaction on a Wristband, CHI '15 Extended Abstracts, Seoul, Republic of Korea, Apr. 18-23, 2015, pp. 251-254.

Araki, H., et al., Development of a Horror Game that Route Branches by the Player's Pulse Rate, IUI '18 Companion, Mar. 7-11, 2018, Tokyo, Japan, 2 pgs.

Ashbrook, D., et al., Nenya: Subtle and Eyes-Free Mobile Input with a Magnetically-Tracked Finger Ring, CHI 2011, May 7-12, 2011, Vancouver, BC, Canada, 4 pgs.

Funk, M., et al., Using a Touch-Sensitive Wristband for Text Entry on Smart Watches, CHI 2014, Apr. 26-May 1, 2014, Toronto, Ontario, Canada, 7 pgs.

Harrison, C., et al., Abracadabra: Wireless, High-Precision, and Unpowered Finger Input for Very Small Mobile Devices, UIST'09, Oct. 4-7, 2009, Victoria, British Columbia, Canada, 4 pgs.

Langewitz, W., et al., Spectral Analysis of Heart Rate Variability Under Mental Stress, Journal of Hypertension, 7(6), 1989, pp. S32-S33.

Liang, R-H., et al., GaussRFID: Reinventing Physical Toys Using Magnetic RFID Development Kits, CHI '16, May 7-12, 2016, San Jose, CA, 5 pgs.

Perrault, S. T., et al., WatchIt: Simple Gestures and Eyes-Free Interactions for Wristwatches and Bracelets, CHI 2013, Apr. 27-May 2, 2013, Paris, France, pp. 1451-1460.

Pagani, M., et al., Spectral Analysis of R-R and Arterial Pressure Variabilities to Assess Sympatho-Vagal Interaction During Mental Stress in Humans, Journal of Hypertension, 7(6), 1989, pp. S14-S15.

Saviot, L., et al., Wristband.IO: Expanding Input and Output Spaces of a Smartwatch, CHI'17 Extended Abstracts, May 6-11, 2017, Denver, CO, 9 pgs.

Yoon, S. H., et al., TRing: Instant and Customizable Interactions with Objects Using an Embedded Magnet and a Finger-Worn Device, UIST 2016, Oct. 16-19, 2016, Tokyo, Japan, pp. 169-181.

* cited by examiner

LOW-POWER, PERSONALIZED SMART GRIPS FOR VR/AR INTERACTION

BACKGROUND OF THE INVENTION

Technical Field

The disclosed embodiments relate in general to virtual reality (VR) and augmented reality (AR) systems and, more specifically, to low-power, personalized smart grips for VR/AR interaction.

Description of the Related Art

VR and AR continue to expand in the marketplace: their total market size is expected to expand from 27 billion US dollars in 2018 to 209.2 billion US dollars in 2022. Recent technical advances have expanded the breadth, scope, and affordability of virtual reality (VR) and augmented reality (AR) systems. More people can use VR and AR systems than ever before. However, the expressivity of interactive controls is not keeping pace with this expansion of the VR/AR application market. VR/AR systems tend to employ dedicated controllers that leave developers little room to experiment with and respond to the full range of human abilities, as illustrated in FIGS. 1a, 1b, 1c and 1d. Some dedicated controllers designed for specific systems available in the market include the Vive controller for the HTC Vive system, Oculus Touch controllers for the Oculus Rift, the Daydream controller for the Daydream View available from Google, Inc., and Manus VR Gloves controller for the Manus VR. For the above reason, it remains difficult for developers to create applications that take advantage of the full range of human abilities.

Therefore, in view of the above and other shortcomings of the conventional technology, new and improved hand-held physical controls for VR and AR systems are needed that would provide developers with the requisite flexibility to develop new user applications.

SUMMARY OF THE INVENTION

The embodiments described herein are directed to systems and methods that substantially obviate one or more of the above and other problems associated with the conventional VR/AR control systems.

In accordance with one aspect of the embodiments described herein, there is provided a computerized system control assembly incorporating: a grip portion configured to be held by a user, the grip portion comprising at least one control component; a mobile computing device incorporating a processing unit, a memory and at least one sensor, the mobile computing device being attached to the grip portion, wherein the memory stores a plurality of executable computer instructions for enabling two way communication between the mobile computing device and an external computer system and for sending a sensor reading from the at least one sensor to the external computing system and for receiving feedback from the external computer system and providing the received feedback to the user and wherein the mobile computing device operates in conjunction with the at least one control component.

In one or more embodiments, the external computer system is an augmented reality system.

In one or more embodiments, the external computer system is a virtual reality system.

In one or more embodiments, the mobile computing device is a smartwatch.

In one or more embodiments, the smartwatch is attached to the grip portion by means of a watch strap.

In one or more embodiments, the smartwatch is attached to the grip portion by means of a magnetic attachment with a watch strap removed.

In one or more embodiments, the least one control component is a magnetic trigger.

In one or more embodiments, the magnetic trigger is configured to be activated by user's finger.

In one or more embodiments, the least one sensor is a magnetometer configured to sense an activation of the magnetic trigger by the user.

In one or more embodiments, the grip portion further comprises a sensor input migration assembly for migrating an input of the least one sensor from the mobile computing device to the grip portion.

In one or more embodiments, the least one sensor is a heart rate sensor and wherein the input migration assembly is an optical fiber optically coupled to the heart rate sensor.

In one or more embodiments, the mobile computing device communicates with the at least one control component via a near field communication (NFC).

In one or more embodiments, the at least one control component is an actuator.

In one or more embodiments, the at least one control component is a button.

In one or more embodiments, the at least one control component is a slider.

In one or more embodiments, the at least one control component is powered by the mobile computing device via a near field communication (NFC).

In one or more embodiments, the grip portion further comprises at least one light source for tracking a location or orientation of the grip portion.

In one or more embodiments, the grip portion further comprises at least one light detector for tracking a location or orientation of the grip portion.

In accordance with another aspect of the embodiments described herein, there is provided a method involving: attaching a grip portion configured to be held by a user, the grip portion comprising at least one control component, to a mobile computing device comprising a processing unit, a memory and at least one sensor; enabling two way communication between the mobile computing device and an external computer system; sending a sensor reading from the at least one sensor to the external computing system; receiving feedback from the external computer system; and providing the received feedback to the user, wherein the mobile computing device operates in conjunction with the at least one control component.

In accordance with yet another aspect of the embodiments described herein, there is provided a non-transitory computer-readable medium embodying a set of instructions implementing a method performed in conjunction with a computerized system control assembly comprising: a grip portion configured to be held by a user, the grip portion comprising at least one control component and a mobile computing device comprising a processing unit, the non-transitory computer-readable medium and at least one sensor, the mobile computing device being attached to the grip portion; the method involving: enabling two way communication between the mobile computing device and an external computer system; sending a sensor reading from the at least one sensor to the external computing system; receiving feedback from the external computer system; and providing the received feedback to the user, wherein the mobile computing device operates in conjunction with the at least one control component.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1A:
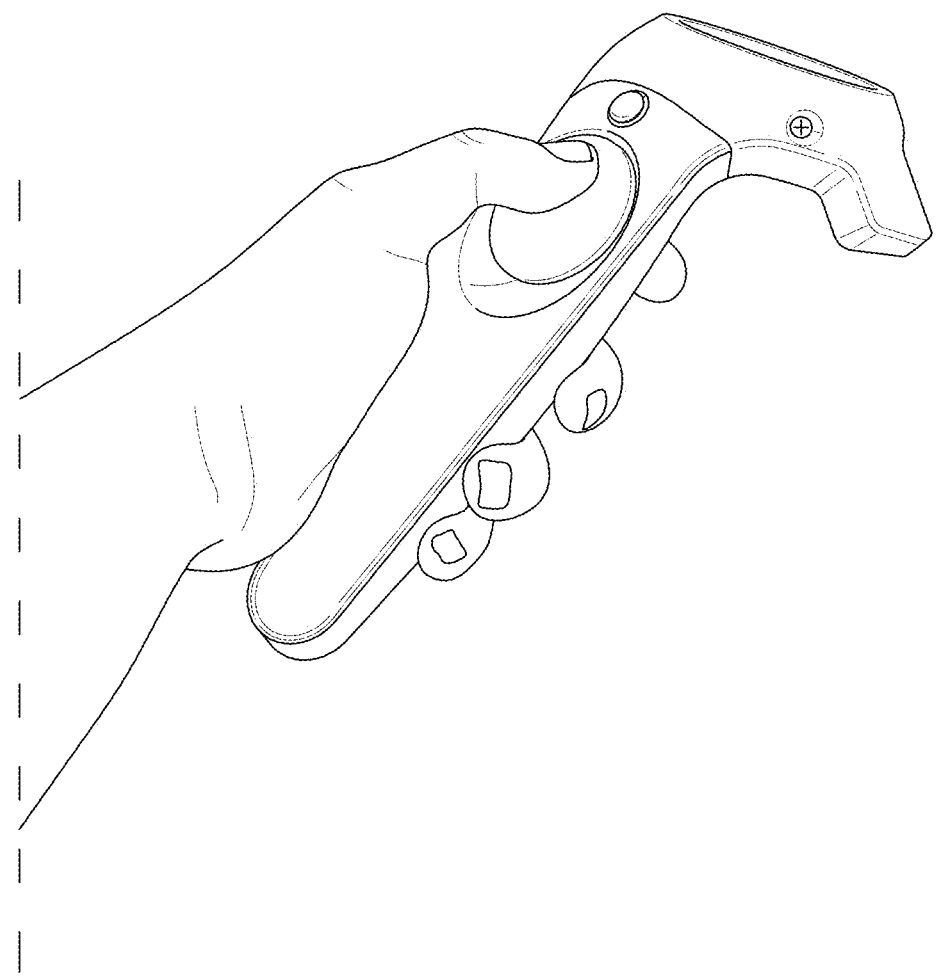
FIG. 1a illustrates a commercially available Vive controller.
Figure 1B:
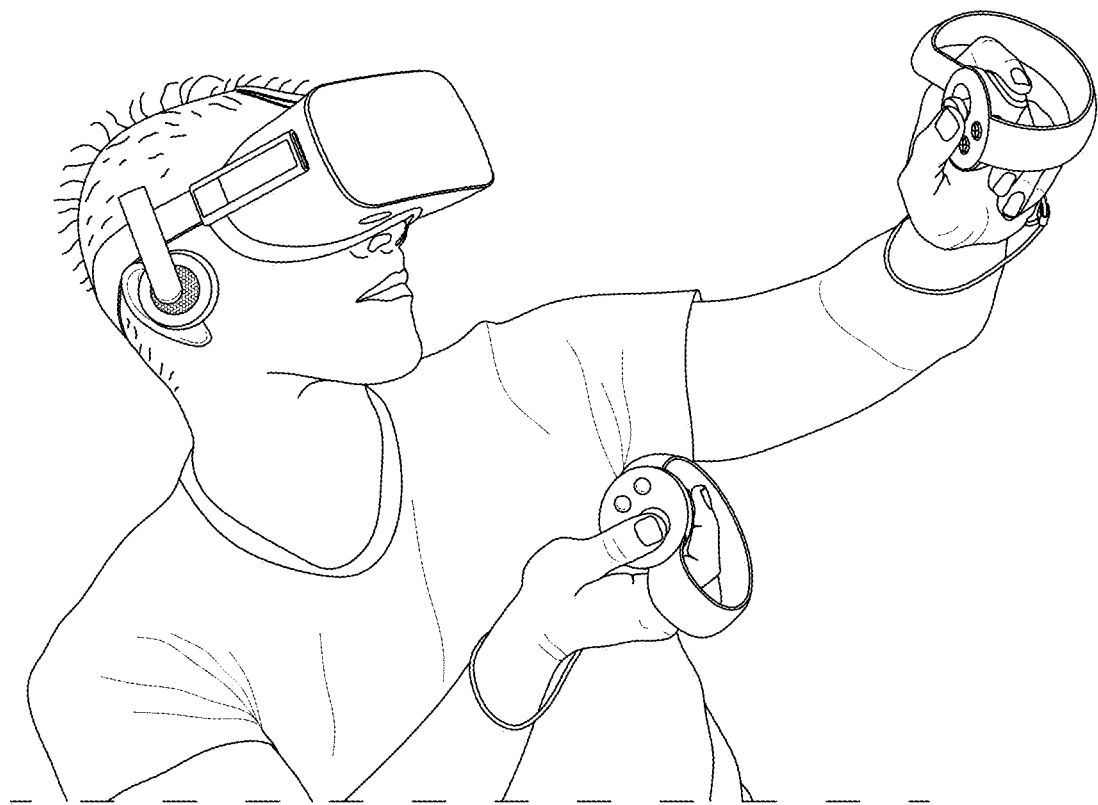
FIG. 1b illustrates commercially available Opus Rift controllers.
Figure 1C:
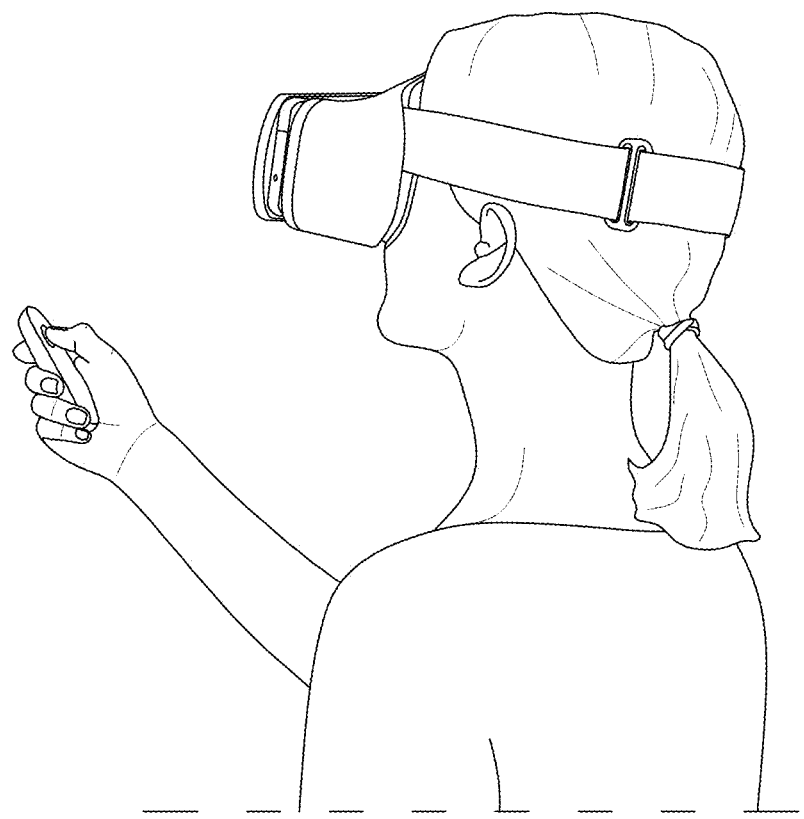
FIG. 1c illustrates Daydream controller available from Google, Inc.
Figure 1D:
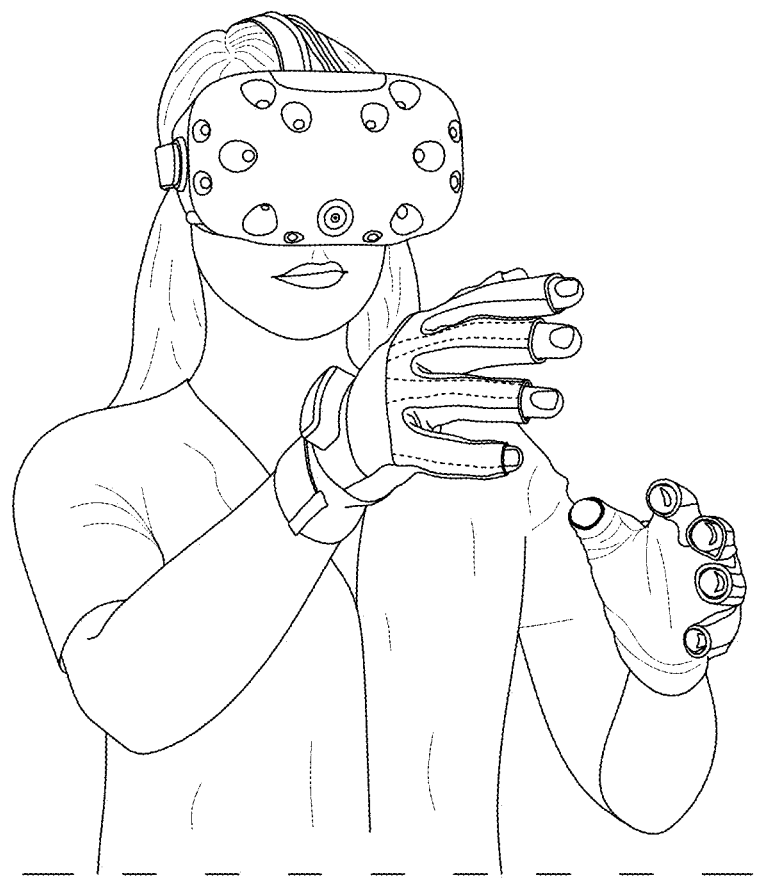
FIG. 1d illustrates commercially available Manus VR Gloves controller.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In according to one aspect of the embodiments described herein, there is provided a system and method for implementing low-power, personalized smart grips for VR/AR interaction. One embodiment combines a user's personal smartwatch with inexpensive grips or sheaths. In various embodiments, the described smartwatch can be combined with the grip either directly (leaving the watch straps on) or by detaching the watch unit from its straps and integrating it into the grip. With this approach, developers would build a smartwatch software application that can be used in combination with a range of separate grips to control a VR/AR application. This approach has several advantages over the state-of-the-art as well as other alternatives.

In one or more embodiments, by separating the computational unit from the physical grip, developers can integrate a much wider variety of controller designs, allowing them to tailor the user experience of particular VR/AR applications. Furthermore, this approach allows designers and developers to more easily personalize each application's experience to match user preferences imported from the smartwatch. Developers could also release multiple different inexpensive grips to provide users different ways of experiencing their application, or grips that support non-traditional (e.g., differently-abled) users. Lastly, the grip itself does not require a separate power source: we take advantage of the smartwatch to not only power grip buttons but also take advantage of the smartwatch's other sensors, such as heart rate sensors.

In comparison, conventional controllers do not provide any method to integrate different grip styles, personalize their use, nor integrate external sensors. Though we are not aware of any universal controller for VR/AR systems, it would be impossible to construct one that provides all of the benefits of our system as there is no universal physical form nor agreed-upon set of interactors or sensors to build into such a unit.

In various embodiments, the described system and method combines a smartwatch with a set of inexpensive grips or sheaths to control various VR/AR systems. In various embodiments, the watch and grip are connected using one of two methods. In accordance with the first method, connecting involves attaching the watch and its strap onto the grip. In accordance with the second method, attaching involves detaching the watch from its strap and integrating the so detached watch into the grip.

In one or more embodiments, the grip incorporates a variety of unpowered mechanical elements, including, without limitation, magnetized triggers, buttons, sliders, LEDs, and other sensors that can be shaped and tailored to particular VR/AR applications. In one or more embodiments, the grip is designed in such a way as to take advantage of NFC from the smartwatch to power its onboard mechanical elements. In one or more embodiments, a software application deployed on the smartwatch can translate sensed events from the grip into events relevant to the VR/AR application to which it is connected.

Figure 2:
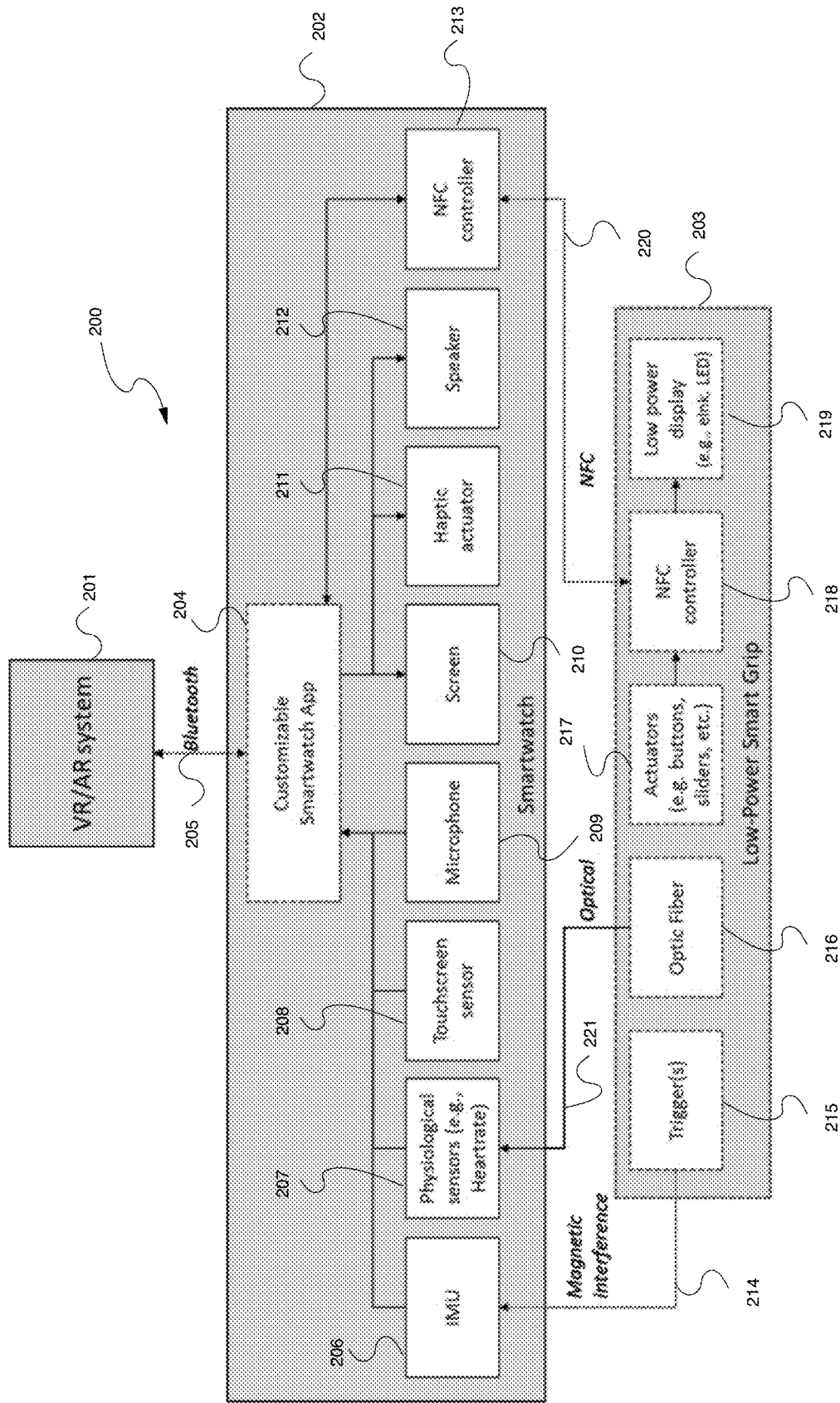
FIG. 2 illustrates an exemplary embodiment of a system incorporating a low-power, personalized smart grips for VR/AR interaction.

In one or more embodiments, the described system 200 is illustrated in FIG. 2 and described in detail below. The system described herein is operated in conjunction with a VR/AR system 201, which is connected to the described system 200 via Bluetooth 205 or other appropriate wireless data interconnect. As would be appreciated by persons of ordinary skill in the art, the exact nature of the data interconnect is not critical to the inventive concepts described herein. A dedicated software application 204 is used to communicate wirelessly with the computing device running the VR/AR system 201. In various embodiments, such system may be a computer, a smartphone, or a similar computing device. In various embodiments, the user downloads this dedicated software application 204 onto their smartwatch 202.

In one or more embodiments, the system 200 incorporates the smartwatch 202 as well as a low-power smart grip 203. The smartwatch 202 may incorporate an inertial measurement unit 206, which is an electronic device that measures and reports a body's specific force, angular rate, and sometimes the magnetic field surroundings the body, using a combination of accelerometers and gyroscopes, sometimes also magnetometers. In addition, the smartwatch 202 may incorporate certain number of physiological sensors, such as heart rate, blood pressure, blood oxygen level, blood sugar level sensors, as well as others.

In one or more embodiments, further incorporated within the smartwatch 202 may be a touchscreen sensor 208, microphone 209, screen 210, haptic actuator 211, audio speaker 212 and a near-field communication (NFC) controller 213. The design, manufacture and operation of all of the above units are well known in the art and widely available in the published literature.

In one or more embodiments, the smartwatch 202 is operated in conjunction with a low-power smart grip designated in FIG. 2 with numeral 203. In various embodiments, this grip may incorporate one or more mechanical triggers 215, optic fiber 216, one or more actuators 217, NFC controller 218 and low-power display 219. As would be appreciated by ordinary skilled in the art, in various embodiments, the low-power smart grip designated in FIG. 2 with numeral 203 may incorporate other suitable components and sensors. Therefore, the invention is not limited to only the components enumerated above.

Figure 3:
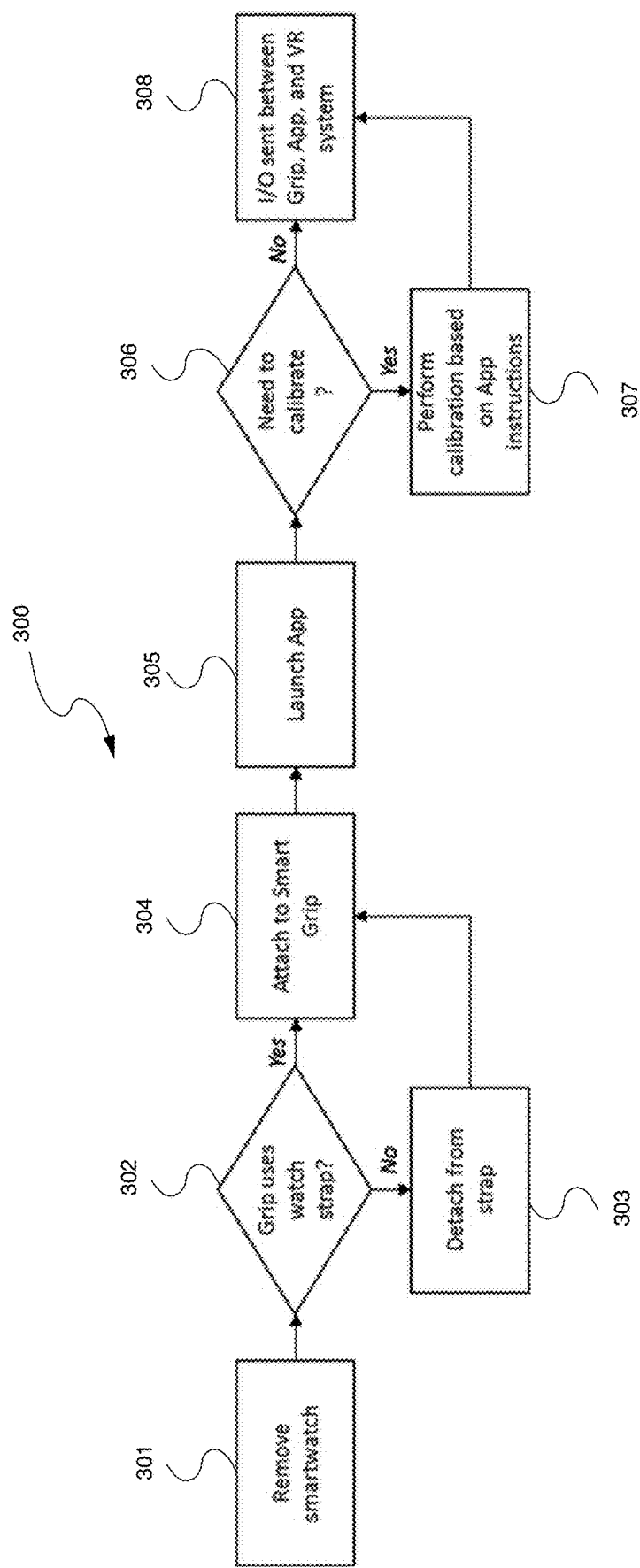
FIG. 3 illustrates an exemplary operating sequence of an embodiment of a system incorporating a low-power, personalized smart grips for VR/AR interaction

FIG. 3 illustrates an exemplary operating sequence 300 of an embodiment of the described system 200. In one or more embodiments, first, the user removes the smartwatch 202, see step 301 in FIG. 3. As it is well known in the art the watch is fixed to the hand of the user using a watchstrap. If the grip 203 does not use the watchstrap for attachment thereto (step 302 in FIG. 3), the user detaches the watchstrap from the smartwatch 202, see step 303. Subsequently, the user attaches the smartwatch 202 to the grip 203 with or without the strap, see step 304.

In one or more embodiments, at step 305, the user downloads and launches the customizable smartwatch application 204. The aforesaid customizable smartwatch application 204 is used by the smartwatch 202 to communicate wirelessly with the computing device running the VR/AR system 210 (which can be a computer, a smartphone, or any other computing device). If the AR/VR control system needs calibration (step 306), the user performs calibration of the system using the instruction provided by the customizable smartwatch application 204, see step 307. Finally, at step 308, data is sent between the grip 203 the customizable smartwatch application 204 and the AR/VR system 201.

Figure 4A:
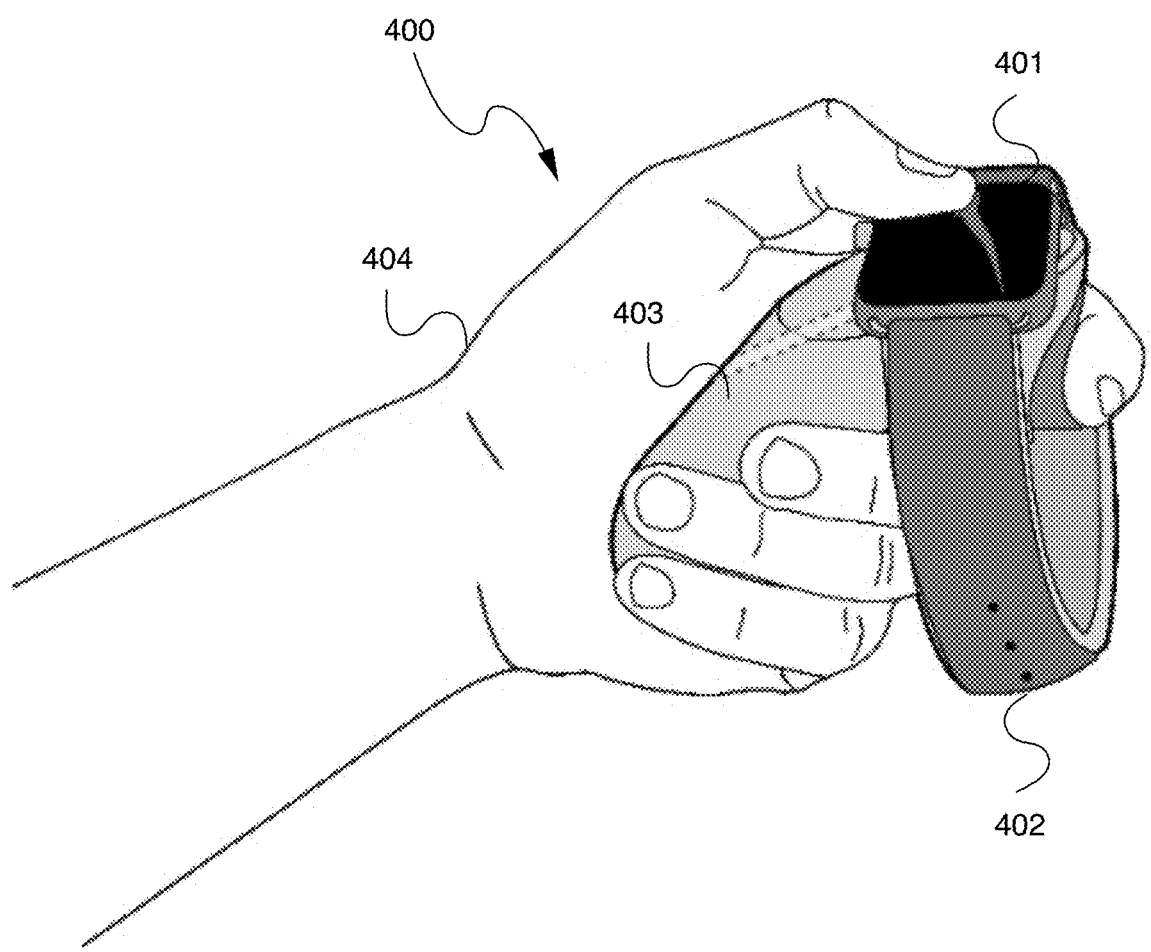
FIGS. 4a, 4b, 4c and 4d illustrate various embodiments of the low-power, personalized smart grip for VR/AR interaction.

In one or more embodiments, the smartwatch 202 may be attached to the low-power smart grip 203 using one of three methods described in detail below. In one embodiment 400, the smartwatch 401 may be attached to the low-power smart grip 403 by wrapping the watch using its strap 402 around a dedicated channel in the grip 403 (see FIG. 4*a*). The user holds the grip 403 with the smartwatch 401 in his or her hand 404.

Figure 4B:
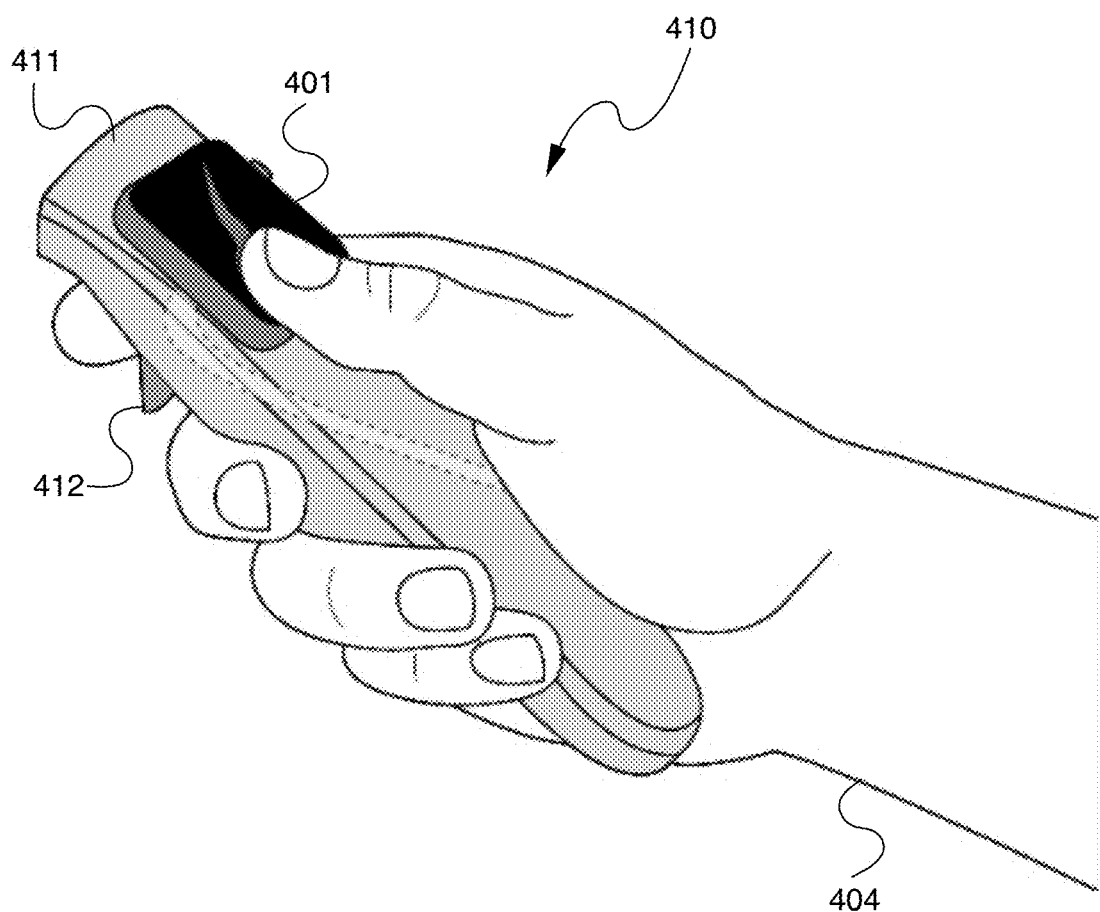

In an another embodiments, the smartwatch 401 is attached to the grip 411 by removing the smartwatch 401 from its watchstrap (not shown) and attaching the smartwatch 401 to compatible electrical connectors on the grip 411, as shown in FIG. 4*b* (the connectors on the back side of the smartwatch are not shown in FIG. 4*b*). In one or more embodiments, the grip 411 may be equipped with a mechanical trigger 412. The aforesaid compatible electrical connectors on the grip 411 on the grip 411 may comprises a plurality of spring-loaded electrical connection pins disposed in a dedicated slot on the grip provided for the watch 401.

Figure 4C:
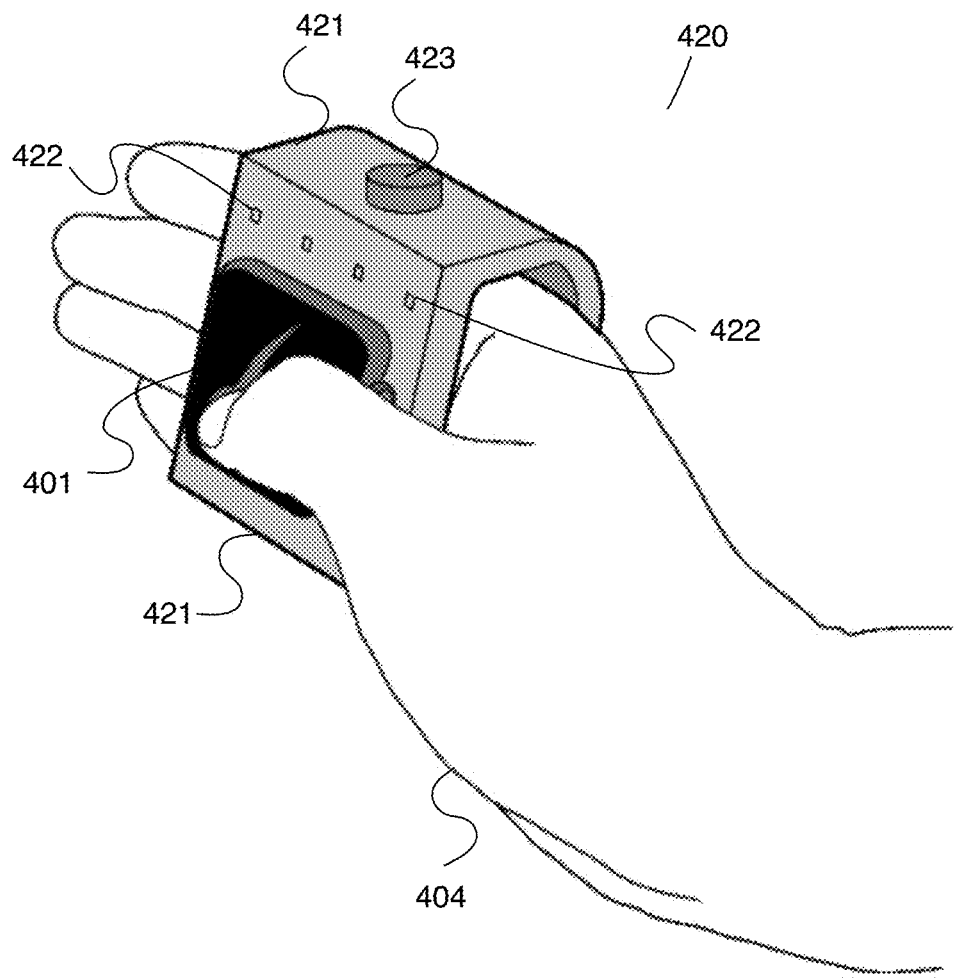
Figure 4D:
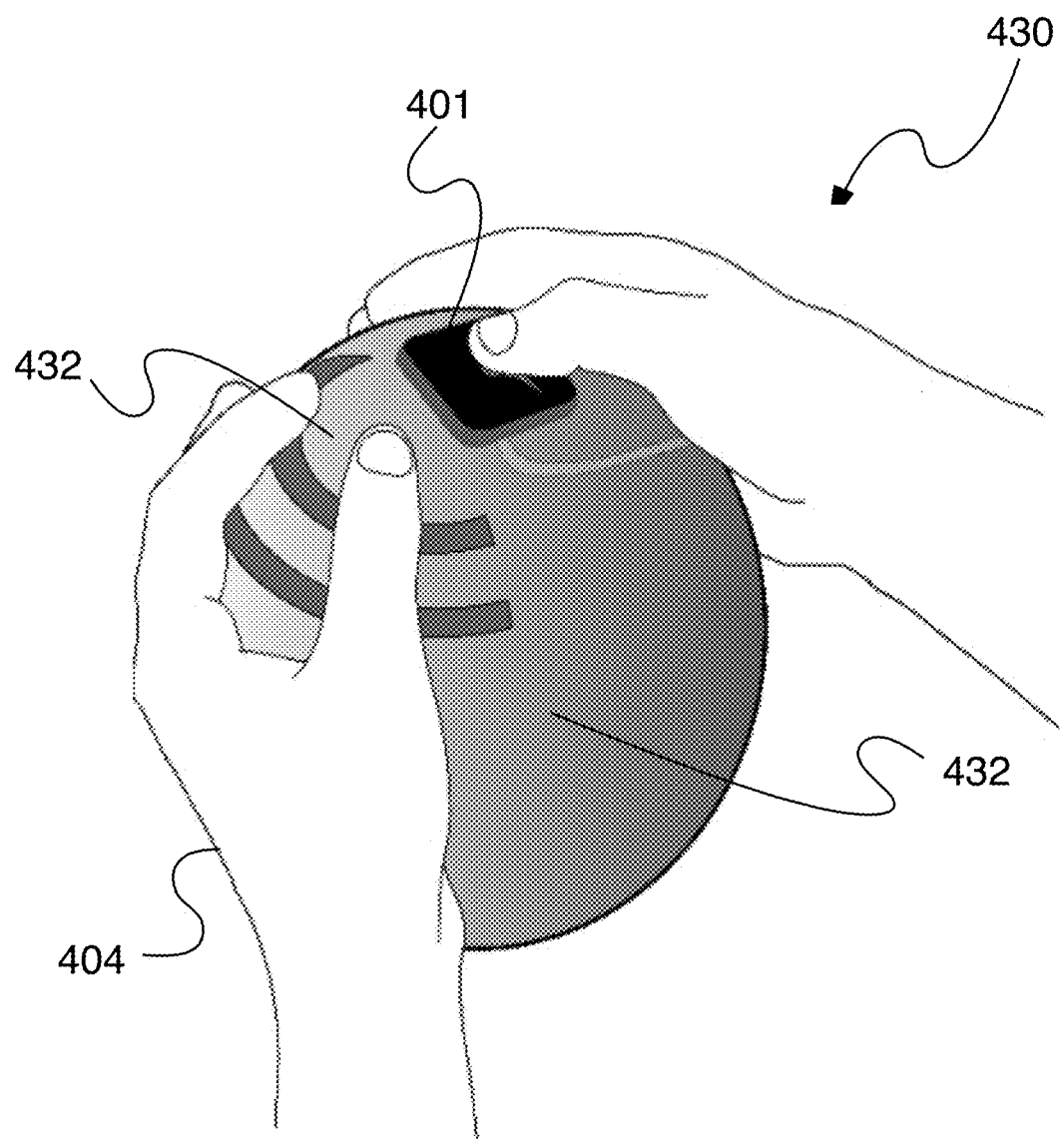

In yet another embodiment, the smartwatch is attached to the grip by removing the watch from its strap and attaching it to the device with magnetic connectors, as shown in FIGS. 4*c* and 4*d*. Specifically, as shown in FIG. 4*c*, the smartwatch 401 is removed from the watchstrap and attached to the grip 421 using magnets disposed on the back of the smartwatch and on the grip 421. The aforesaid margents operate to keep the watch in place on the grip 421. To facilitate the fixation of the smartwatch 401 to the grip 421, the latter may be equipped with a special slot. As shown in FIG. 4*c*, the smart grip 421 may additionally incorporate one or more buttons 423 as well one or more indicators 422. As shown in FIG. 4*d* the smartwatch 401 is removed from the watchstrap and attached to a spherical AR/VR control 432, which has a shape of a ball.

In another embodiment, once the smartwatch is attached to the smart grip, the user launches the customizable smartwatch application 204 running on the smartwatch 202. The customizable smartwatch application 204 connects the smartwatch 202 to the AR/VR system 201 wirelessly and begins sending one or more of the following data records to the VR system: (1) IMU 206 sensor data including, without limitation, accelerometer and magnetometer data; (2) touch events from the smartwatch's touchscreen 210 and (3) user's heart-rate, blood oxygen, etc. readings obtained using the physiological sensors 207 as well as all trigger presses. Those are classified by the app based on changes in magnetometer readings (see "Unpowered Triggers using Magnetic Motion" below). In addition, the smartwatch 202 may send to the AR/VR system 201 (4) sensor readings from low power input elements, such as buttons, sliders, and the like controls, communicated over the watch's NFC, as described in detail below.

In one or more embodiments, the customizable smartwatch application 204 may receive the following data from the VR/AR system 201: (1) system calls to actuate the watch's vibration motor and (2) system calls to apply changes to low-power display elements on the device, e.g. using the watch's NFC unit; (3) system calls to illuminate the smartwatch's screen 210 (for AR use-cases).

In one or more embodiments, if this is the first time that the user runs the app with a particular grip, the user will go through a system training/calibration step as follows: (1) the customizable smartwatch application 204 will ask the user to hold the grip in different orientations and perform in-air gestures; (2) the customizable smartwatch application 204 will ask the user to swipe up down left and right on the watch's touchscreen; (3) the customizable smartwatch application 204 will ask the user to demonstrate different triggers and map them to known events (e.g., press the main trigger now or tap the watch's screen to skip).

One embodiment takes advantage of the smartwatch IMU 206 to support six degree of freedom interaction between the combined smartwatch-grip system with the VR/AR system 201. The aforesaid system uses the smartwatch's touchscreen 210 for touch input and the smartwatch's vibrotactile actuators 211 for haptic feedback. This embodiment can also take advantage of a smartwatch's heart-rate sensors 207 by "migrating" the sensing location using optic fiber. In addition, in one embodiment, unpowered mechanical elements, such as triggers 215, that contain magnets that the smartwatch can recognize based on changes in the smartwatch's magnetometer readings (214 in FIG. 2). In one embodiment, additional I/O elements such as buttons, sliders, and LEDs that communicate with the smartwatch over NFC may be also included. In one embodiment, these elements can be powered over NFC and thus the grip 203 (while containing electronic elements) never needs to be charged.

In one or more embodiments, two different methods are used for combining the smartwatch 202 and the related grip 203. In the first, the smartwatch and its strap are fitted onto the device (see FIG. 4a). In this FIG. 4a, the smartwatch 401 and strap 402 are fitted perpendicular to the wrist 404. Alternatively, the smartwatch 401 and strap 402 could also be fitted parallel to the wrist 404. In the second method, the smartwatch is first removed from its strap and fitted into the device, see FIGS. 4b, 4c and 4d. In the second method, the device adheres to the watch's mechanical interface for custom straps, or uses magnetic connections. These magnetic connections do not interfere with sensing of magnetic triggers 412; however, an additional calibration is necessary in this embodiment to establish a baseline with which to compare trigger events.

As would be appreciated by persons of ordinary skill in the art, most smartwatches today include an optical heart-rate (HR) sensor. In the context of VR/HR systems, heart-rate has been used, for example, to control the flow of a game, as described in Araki, Hayato, et al. "Development of a Horror Game that Route Branches by the Player's Pulse Rate." Proceedings of IIUII Companion 2018. For example, the system may control how scary a VR game is based on the player's heart-rate. Prior research identified a relationship between mental stress and changes in components of heart-rate variability (HRV). The challenge in the case of the described embodiment is that smartwatches with HR sensors will have the sensors on the underside of the watch such that they sense HR through the wrist; however, in at least some of the described embodiments, the smartwatch is not worn on the wrist. To be able to still use the watch's HR sensor, in one embodiment, the system takes advantage of these worn HR sensors being optical and migrates the sensing location of the watch's HR sensor using optic fiber.

Specifically, photoplethysmographic (PPG) heart-rate sensors use a combination of one or more LED emitters and a light sensor to detect changes in blood in the capillaries, as described, for example, in U.S. Pat. Nos. 3,228,391, 3,608,545, and 8,948,832. In an embodiment of the described system shown in FIG. 1, optic fiber 221, embedded in the device, allows the light emitted and reflected to be captured under the user's finger (or palm). It should be noted that in order for this approach to work, the smartwatch's sensors must be precisely aligned above the optic fiber. This can be achieved in multiple ways, including physical (the "slot" for the smartwatch prevents misalignment) and magnetic (magnets are used to "snap" the watch into position).

As would be appreciated by persons of ordinary skill in the art, most modern smartwatches include a magnetometer. While this sensor is most frequently used for navigational applications, it can also be leveraged to sense unpowered input by manipulating magnets near the smartwatch. Prior work by Chris Harrison and Scott E. Hudson. 2009. Abracadabra: wireless, high-precision, and unpowered finger input for very small mobile devices. In Proceedings of UIST '09, demonstrated using a ring with a magnet to recognize gestures performed around the watch. The first version of Google Cardboard described in U.S. Pat. No. D750074S1, included a magnet to replace a simple button. One embodiment of the smart grip similarly includes physical unpowered triggers, see element 412 in FIG. 4b. Each trigger mechanism includes a magnet whose motion can be sensed by the smartwatch. For example, pressing a trigger can cause the magnet to spin off axis, generating a recognizable pattern.

As would be appreciated by persons of ordinary skill in the art, most modern smartwatches have vibration motors embedded inside. One embodiment of the smart grip leverages this form of output to provide vibrotactile feedback for virtual or augmented reality. The VR/AR system 201 can send messages to the controller application 204 running on the smartwatch, causing it to vibrate, based on elements in the virtual/augmented environment. In one embodiment, the VR/AR system 201 can instruct the smartwatch 202 to produce a short vibration using the haptic actuator 211 to indicate to the user that they are hovering over a graspable virtual object.

In one or more embodiments, the controller application running on the smartwatch can provide vibrotactile feedback based on parameters of the interaction, agnostic of the VR/AR environment itself. For example, in response to movements or 3D gestures performed by the controller (and sensed by the watch's IMU 206). Or, for example, if the touch interaction on the watch is treated as continuous gained interaction (similar to a joystick) in which dragging the finger away from the watch's center causes faster movement, vibrotactile feedback can be used to indicate to the user the finger's distance from the center point.

As would be appreciated by persons of ordinary skill in the art, most modern smartwatches are equipped with Near Field Communication (commonly known as NFC) capability. While this is most often used for smart payments (Apple Pay, Android Pay, etc), NFC enables data and power transfer between a wide range of devices. In any of the embodiments described above, the smartwatch 202 may power and communicate with the smart grip device 203. This smart grip may include additional inputs (such as buttons, sliders, capacitive touch sensors, etc), additional outputs (such as LEDs, displays, additional vibration motors, speakers, etc), or a combination of the two (see FIGS. 4c and 4d). In one or more embodiments, these I/O elements are powered over NFC, and communicate with the smartwatch 202 over NFC 220. While the tactile elements such as buttons and additional vibration motors are suitable for both VR and AR, visual elements are better suited for AR applications, where the user can physically see the device, as well as the smartwatch screen.

In one or more embodiments, one of the aforesaid outputs may be LEDs used for external tracking, see elements 422 in FIG. 4c. The AR/VR system 201 can use these LEDs to position the controller in 3D space, as they do with their dedicated controllers. Alternatively, one of these inputs may be photodiodes similarly used for position tracking, wherein the AR/VR system 201 emits light, which is picked up by these photodiodes 422, similar to the well known in the art mode of operation of conventional AR/VR controllers operate.

Exemplary Embodiment of a Computer System

Figure 5:
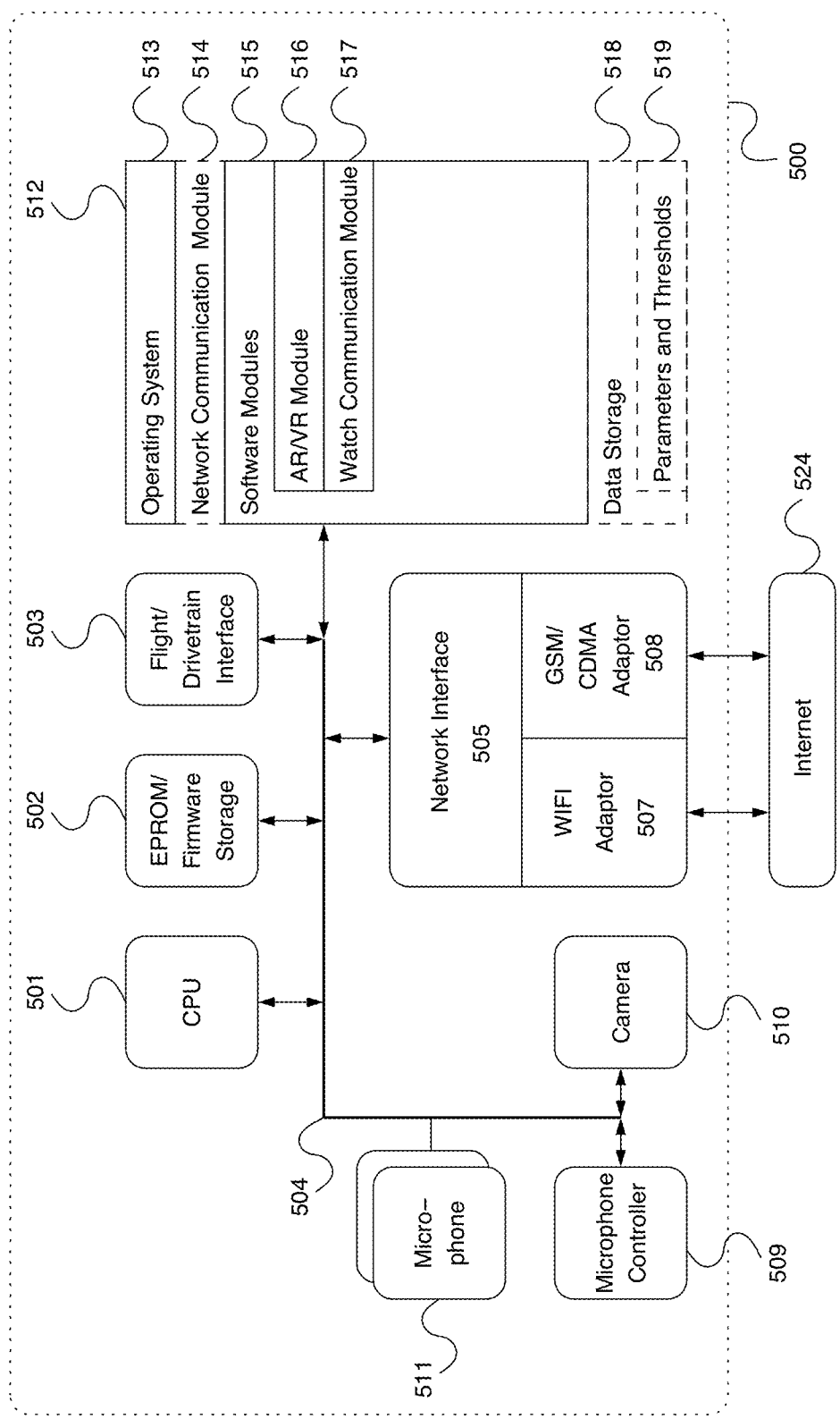
FIG. 5 illustrates an exemplary embodiment of a computer system, which may be used to implement the inventive techniques described herein.

FIG. 5 illustrates an exemplary embodiment of a computer system 500, which may be used to implement the techniques described herein and, for example, the AR/VR system 201. In one or more embodiments, the computer 500 may be implemented within the form factor of a mobile computing device well known to persons of skill in the art. In an alternative embodiment, the computer 500 may be implemented based on a laptop or a notebook computer. Yet in an alternative embodiment, the computer 500 may be a specialized computing system.

The computer 500 may include a data bus 504 or other interconnect or communication mechanism for communicating information across and among various hardware components of the computer 500, and a central processing unit (CPU or simply processor) 501 coupled with the data bus 504 for processing information and performing other computational and control tasks. The computer 500 also includes a memory 512, such as a random access memory (RAM) or other dynamic storage device, coupled to the data bus 504 for storing various information as well as instructions to be executed by the processor 501. The memory 512 may also include persistent storage devices, such as a magnetic disk, optical disk, solid-state flash memory device or other non-volatile solid-state storage devices.

In one or more embodiments, the memory 512 may also be used for storing temporary variables or other intermediate information during execution of instructions by the processor 501. Optionally, computer 500 may further include a read only memory (ROM or EPROM) 502 or other static storage device coupled to the data bus 504 for storing static information and instructions for the processor 501, such as firmware necessary for the operation of the computer 500, basic input-output system (BIOS), as well as various configuration parameters of the computer 500.

In one or more embodiments, the computer 500 may additionally incorporate camera 510 for acquiring still images as well as the real-time video. In addition, the computer 500 may incorporate a microphone 511 for picking up the audio as well as a microphone control module 509 for automatically muting and un-muting the microphone 511 based on user's head pose.

In one or more embodiments, the computer 500 may additionally include a communication interface, such as a network interface 505 coupled to the data bus 504. The network interface 505 may be configured to establish a connection between the computer 500 and the Internet 524 using at least one of WIFI interface 507 and the cellular network (GSM or CDMA) adaptor 508. The network interface 505 may be configured to provide a two-way data communication between the computer 500 and the Internet 524. The WIFI interface 507 may operate in compliance with 802.11a, 802.11b, 802.11g and/or 802.11n protocols as well as Bluetooth protocol well known to persons of ordinary skill in the art. In an exemplary implementation, the WIFI interface 507 and the cellular network (GSM or CDMA) adaptor 508 send and receive electrical or electromagnetic signals that carry digital data streams representing various types of information.

In one or more embodiments, the Internet 524 typically provides data communication through one or more sub-networks to other network resources. Thus, the computer 500 is capable of accessing a variety of network resources located anywhere on the Internet 524, such as remote media servers, web servers, other content servers as well as other network data storage resources. In one or more embodiments, the computer 500 is configured send and receive messages, media and other data, including application program code, through a variety of network(s) including Internet 524 by means of the network interface 505. In the Internet example, when the computer 500 acts as a network client, it may request code or data for an application program executing in the computer 500. Similarly, it may send various data or computer code to other network resources.

In one or more embodiments, the functionality described herein is implemented by the computer 500 in response to processor 501 executing one or more sequences of one or more instructions contained in the memory 512. Such instructions may be read into the memory 512 from another computer-readable medium. Execution of the sequences of instructions contained in the memory 512 causes the processor 501 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 501 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 501 for execution. For example, the instructions may initially be carried on a magnetic disk from a remote computer. Alternatively, a remote computer can load the instructions into its dynamic memory and send the instructions over the Internet 524. Specifically, the computer instructions may be downloaded into the memory 512 of the computer 500 from the foresaid remote computer via the Internet 4 using a variety of network data communication protocols well known in the art.

In one or more embodiments, the memory 512 of the computer 500 may store any of the following software programs, applications and/or modules:

1. Operating system (OS) 513, which may be a mobile operating system for implementing basic system services and managing various hardware components of the computer 500. Exemplary embodiments of the operating system 513 are well known to persons of skill in the art, and may include any now known or later developed mobile operating systems. Additionally provided may be a network communication module 514 for enabling network communications using the network interface 505.

2. Software modules 515 may include, for example, a set of software modules executed by the processor 501 of the computer 500, which cause the computer 500 to perform certain predetermined functions, such as communicate with the smartwatch 202 (module 517) and/or operate the AR/VR system (module 516).

3. Data storage 518 may be used, for example, for storing various parameters and thresholds 519.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for implementing low-power, personalized smart grips for VR/AR interaction. It is intended that the specification and examples be considered as exemplary only, with a true scope and spirit of the invention being indicated by the following claims.

What is claimed is:

1. A computerized system control assembly comprising:
   a. a grip portion configured to be gripped by a hand of a user, the grip portion comprising at least one control component; and
   b. a mobile computing device comprising a processing unit, a memory and at least one sensor, the mobile computing device being removably attached to the grip portion, wherein the memory stores a plurality of executable computer instructions for:
      enabling two way communication between the mobile computing device and an external computer system,
      receiving user input from on the at least one control component of the grip portion via a near field communication (NFC) and communicating the user input to the external computer system,
      sending a sensor reading from the at least one sensor to the external computing system, and
      receiving feedback from the external computer system and providing the received feedback to the user,
   wherein the mobile computing device operates in conjunction with the at least one control component.

2. The computerized system control assembly of claim 1, wherein the external computer system is an augmented reality system.

3. The computerized system control assembly of claim 1, wherein the external computer system is a virtual reality system.

4. The computerized system control assembly of claim 1, wherein the mobile computing device is a smartwatch.

5. The computerized system control assembly of claim 4, wherein the smartwatch is attached to the grip portion by means of a watch strap.

6. The computerized system control assembly of claim 4, wherein the smartwatch is attached to the grip portion by means of a magnetic attachment with a watch strap removed.

7. The computerized system control assembly of claim 1, wherein the least one control component is a magnetic trigger.

8. The computerized system control assembly of claim 7, wherein the magnetic trigger is configured to be activated by user's finger.

9. The computerized system control assembly of claim 7, wherein the least one sensor is a magnetometer configured to sense an activation of the magnetic trigger by the user.

10. The computerized system control assembly of claim 1, wherein the grip portion further comprises a sensor input migration assembly for migrating an input of the least one sensor from the mobile computing device to the grip portion.

11. The computerized system control assembly of claim 10, wherein the least one sensor is a heart rate sensor and wherein the input migration assembly is an optical fiber optically coupled to the heart rate sensor.

12. The computerized system control assembly of claim 1, wherein the mobile computing device communicates with the at least one control component via a NFC.

13. The computerized system control assembly of claim 1, wherein the at least one control component is an actuator.

14. The computerized system control assembly of claim 1, wherein the at least one control component is a button.

15. The computerized system control assembly of claim 1, wherein the at least one control component is a slider.

16. The computerized system control assembly of claim 1, wherein the at least one control component is powered by the mobile computing device via NFC.

17. The computerized system control assembly of claim 1, wherein the grip portion further comprises at least one light source for tracking a location or orientation of the grip portion.

18. The computerized system control assembly of claim 1, wherein the grip portion further comprises at least one light detector for tracking a location or orientation of the grip portion.

19. The computerized system control assembly of claim 1, wherein the external computer system is an augmented reality system or a virtual reality system and the mobile computing device is a smartwatch, and wherein the smartwatch is attached to the attachment surface of the grip portion by means of one or more connectors with a watch strap removed.

20. A method comprising:
   a. attaching a grip portion configured to be gripped by a hand of a user, the grip portion comprising at least one control component, to a mobile computing device comprising a processing unit, a memory and at least one sensor;
   b. enabling two way communication between the mobile computing device and an external computer system;
   c. receiving user input from on the at least one control component of the grip portion via a near field communication (NFC) and communicating the user input to the external computer system,
   d. sending a sensor reading from the at least one sensor to the external computing system;
   e. receiving feedback from the external computer system; and
   f. providing the received feedback to the user, wherein the mobile computing device operates in conjunction with the at least one control component.

21. A non-transitory computer-readable medium embodying a set of instructions implementing a method performed in conjunction with a computerized system control assembly comprising: a grip portion configured to be gripped by a hand of a user, the grip portion comprising at least one control component and a mobile computing device comprising a processing unit, the non-transitory computer-readable medium and at least one sensor, the mobile computing device being removably attached to the grip portion; the method comprising:
   a. enabling two way communication between the mobile computing device and an external computer system;
   b. receiving user input from on the at least one control component of the grip portion via a near field communication (NFC) and communicating the user input to the external computer system, c. sending a sensor reading from the at least one sensor to the external computing system;
d. receiving feedback from the external computer system; and
e. providing the received feedback to the user, wherein the mobile computing device operates in conjunction with the at least one control component.

\* \* \* \* \*